US012742714B2

(12) United States Patent
Zych et al.

(10) Patent No.: US 12,742,714 B2
(45) Date of Patent: Sep. 22, 2026

(54) SYSTEM FOR MEASURING OF A CONCENTRATION PARAMETER OF A FLOW OF A SOLID/LIQUID MIXTURE

(71) Applicant: IHC Holland IE B.V., Sliedrecht (NL)

(72) Inventors: Krzysztof Stanislaw Zych, Kinderdijk (NL); Bram Bryan Visser, Kinderdijk (NL); Jacob Osnabrugge, Kinderdijk (NL)

(73) Assignee: IHC Holland I.E. B.V., Sliedrecht (NL)

( * ) Notice: Subject to any disclaimer, the term of this patent is extended or adjusted under 35 U.S.C. 154(b) by 270 days.

(21) Appl. No.: 18/567,031

(22) PCT Filed: Jun. 14, 2022

(86) PCT No.: PCT/NL2022/050331
§ 371 (c)(1),
(2) Date: Dec. 5, 2023

(87) PCT Pub. No.: WO2022/265499
PCT Pub. Date: Dec. 22, 2022

(65) Prior Publication Data

US 2024/0264095 A1 Aug. 8, 2024

(30) Foreign Application Priority Data

Jun. 16, 2021 (NL) ..................................... 2028468

(51) Int. Cl.
*G01N 9/00* (2006.01)
*G01F 1/58* (2006.01)

(52) U.S. Cl.
CPC ............... *G01N 9/00* (2013.01); *G01F 1/588* (2013.01)

(58) Field of Classification Search
CPC .......... G01N 9/00; G01N 22/00; G01N 22/04; G01F 1/588
See application file for complete search history.

(56) References Cited

U.S. PATENT DOCUMENTS 4,423,623 A * 1/1984 Ho ......................... G01N 22/00 73/61.41
4,755,743 A 7/1988 Jakkula
5,701,083 A * 12/1997 Goldberg ............... G01N 22/04 73/61.41

(Continued)

FOREIGN PATENT DOCUMENTS

CN 108642420 A * 10/2018 ............. C23C 2/385
EP 0724 138 A1 7/1996

(Continued)

*Primary Examiner* — Justin N Olamit
(74) *Attorney, Agent, or Firm* — Ipsilon USA—NLO

(57) ABSTRACT

The present invention relates to a system for measuring of a concentration parameter of a flow of a solid/liquid mixture (M), the system comprising;

an antenna arrangement for feeding electromagnetic energy into the a volume of mixture under test and receiving a response back from the volume of the mixture under test, wherein the antenna arrangement comprises a ring shaped conductive antenna member having an opening for passing the flow of solid/liquid mixture (M) there through, wherein the ring shaped conductive antenna member and the opening thereof define the measurement volume of mixture under test.

22 Claims, 8 Drawing Sheets

(56) References Cited

U.S. PATENT DOCUMENTS

| | | | | |
|---|---|---|---|---|
| 9,470,565 | B2 * | 10/2016 | Kromwijk | G01F 25/10 |
| 12,104,936 | B2 * | 10/2024 | Xie | G01F 1/64 |
| 2008/0087099 | A1 | 4/2008 | Allenberg et al. | |

FOREIGN PATENT DOCUMENTS

| | | | |
|---|---|---|---|
| EP | 0990887 | A2 | 4/2000 |
| EP | 2089694 | B1 | 8/2017 |
| GB | 2490685 | A | 11/2012 |
| JP | H09-159595 | A | 6/1997 |
| WO | 92/22834 | A1 | 12/1992 |
| WO | 2008/069670 | A1 | 6/2008 |

* cited by examiner

Measured transmission phase of $TE_{11}$ mode

Transmission phase shift $\measuredangle S_{21}$ [o]

20
0
-20
-40
-60
-80
-100
-120

0.9 1.0 1.1 1.2 1.3 1.4 1.5

Density [t/m$^3$]

SYSTEM FOR MEASURING OF A CONCENTRATION PARAMETER OF A FLOW OF A SOLID/LIQUID MIXTURE

FIELD OF THE INVENTION

The present invention relates to a system for measuring of a concentration parameter of a flow of a solid/liquid mixture, in particular of a dredge flow in a dredging pipeline.

The present invention also relates to a measuring apparatus comprising the system for measuring of a concentration parameter of a flow of a solid/liquid mixture and a velocity metering unit.

The present invention also relates to a method for the measuring of a concentration parameter of a solid/liquid mixture (M), in particular dredge.

BACKGROUND ART

Measuring a concentration parameter of a material stream in a conveyor pipe is important for industries which use hydraulic transportation in their operations. Examples of such industries are dredging, wet mining, offshore drilling and tunnelling. For example during dredging operations it is crucial to monitor the solid/water mixture as well as the velocity of the mixture to watch the efficiency of the dredging operation on the one hand and avoid silting up of the dredging pipeline on the other hand.

Several technologies and methodologies are known to monitor slurry density in industrial applications like dredging, mining and tunnelling. In those fields density meters based on radio activity as well as sources of radioactivity are typically used for slurry monitoring. This type of monitoring has a number of disadvantages. First of all, only certified personnel can work with these density meters. Furthermore, the complete handling and transport of radioactive sources requires special permits and must be done with special precautions. For all these disadvantages associated with this type of density meter, a more save alternative is needed while at the same time ensuring the same or higher quality of accuracy in density measurement.

It is also known to utilize electromagnetic waves to determine density in liquid/solid mixtures. An example of such a system is found in WO 2008/069670 A1, that uses patch antenna's. for the measuring of a concentration parameter of a solid/liquid mixture. The system of WO 2008/069670 A1 comprises a steel pipe, that is protected (lined) with a dielectric layer, with a pair of patch antennas embedded in that liner. There is collinear orientation of the antennas, therefore radio wave is sent in a straight line between the antennas. The signal transmission between the patch antennas is dependent on the properties of the mixture under test. It was however discovered during practical tests, that this solution only functions in a limited range of practical situations in particular when the mixture under test comprises fresh, clean water. However, when the salinity of water in the mixture under test increases, the full liner creates an alternative propagation path for the radio waves and thus omitting the mixture under test. Therefore, the desired measurement of the concentration parameter is disturbed. Also, when the patch antennas are placed in a cut-outs in the pipe, this severely compromises the mechanical integrity of the pipe, and increase the mechanical complexity of the whole system. In addition, the system of WO 2008/069670 A1 is hard to integrate with other measurement systems like a mixture velocity metering unit. A system of WO 2008/069670 A1 in series with a mixture velocity metering unit easily exceeds an installation length of 2 meters. That is increasingly unacceptable.

In this context, U.S. Pat. No. 4,755,743A describes a device for measuring moisture of a mixture running within a process pipe, wherein a dielectric waveguide is embedded into the wall of the process pipe. The dielectric ring is surrounded from three sides by metal, and the interaction with the material under test is poor. Therefore, varying properties of the material in the pipe only slightly affect wave propagation.

SUMMARY OF THE INVENTION

The present invention seeks to provide a system for measuring of a concentration parameter of a flow of a solid/liquid mixture wherein a volume of the mixture under test is better defined. This in turn maintains a defined propagating mode into a slurry pipe line.

As a further aspect, the invention seeks to provide a system for measuring of a concentration parameter of a flow of a solid/liquid mixture wherein the system is more suitable to be integrated with a pipe section As a further aspect, the invention seeks to provide a system for measuring of a concentration parameter of a flow of a solid/liquid mixture wherein the system can be easily combined with a further measuring system requiring a dielectric liner between the mixture and the pipe wall like for example a mixture velocity metering system that is known per se. In this context it is relevant that a pipe in a measurement section is commonly lined with a layer of protective polymer, or composite of polymer and high hardness ceramic material. The reason is that transported material has abrasive properties, and therefore may cause gradual damage to the conduit pipe. This results in a steel pipe lined with a dielectric layer. In other words this aspect seeks to provide a solution to launching propagating mode, for measuring of concentration of solid particles in an aqueous mixture, into a slurry conveying pipe having a dielectric liner.

Lastly, the invention seeks to provide an alternative system for measuring of a concentration parameter of a flow of a solid/liquid mixture.

The present invention therefore, provides a system for measuring of a concentration parameter of a flow of a solid/liquid mixture (M), the system comprising;

- an antenna arrangement for feeding electromagnetic energy into a volume of mixture under test, mut, and receiving a response back from the volume of the mixture under test,
- an electromagnetic signal power source operationally coupled with the antenna arrangement,
- an evaluation unit operationally coupled with the antenna arrangement for evaluating the response back from the volume of mixture under test, wherein the antenna arrangement comprises an isolated ring shaped conductive antenna member having an opening for passing the flow of solid/liquid mixture (M) there through, wherein the ring shaped conductive antenna member and the opening thereof define the measurement volume of mixture under test, and wherein the electromagnetic signal power source and the ring shaped conductive antenna member are configured such that the antenna arrangement provides a transmission path of an electromagnetic wave through the mixture under test.

The electromagnetic signal power source and the ring shaped conductive antenna member can be operated in any suitable way, as mentioned below, in order to provide a transmission path of an electromagnetic wave through the mixture under test. The electromagnetic signal power source and the ring shaped conductive antenna member can be operated in waveguide mode, resonance mode, may excite one or more of a TE, TM and TEM mode. Important is that the electromagnetic energy interacts with the volume of mixture under test.

The antenna arrangement comprising a ring shaped conductive antenna member provides the possibility to integrate the system with a pipe section without requiring modification of the structure of the pipe section. Thus, the strength of the pipe section is not compromised.

In a dredging system, usually both a device for measuring of a concentration parameter as well as a velocity metering system is installed. A common velocity metering system is based on the hall effect and that requires that the volume of mixture under test is electrically isolated from the metal pipe wall. Therefore, and for other reasons, a liner is provided. Only measurement terminals contact the mixture under test to pick up the hall effect. Metal rings are embedded in the liner to protect the liner from abrasion by the dredge mixture. In case of integration with a velocity metering system, the present end rings of the velocity metering system can surprisingly function as such a ring shaped conductive antenna member. Therefore, the installation length of such a combined system can be reduced. In fact, the current invention is based on the insight that an end ring that is part of a velocity metering system, can actually be used as an antenna member. The same volume of mixture under test can be used for both the velocity metering and for measuring of the concentration parameter. This reduces installation length as mentioned. This is very important in the context of a dredging vessel.

The ring shaped conductive antenna member can be open although a closed ring is preferred. The ring can be of one piece or can have a layered structure. The ring may be hollow in cross section, although a solid ring is preferred. It will thus be clear that there is some freedom in the configuration of the ring shaped conductive antenna member, as long as the ring is conductive. The ring can be operated in a waveguide resonance mode, however any suitable operation mode is possible.

The concentration parameter refers to a ratio between water content of the mixture and solid matter content.

The "response back" refers to e.g. attenuation of the electromagnetic signal, reflections, number of reflections, amplitude change, phase change or any other conceivable change in signal parameters caused by the mixture under test.

An isolated antenna member is to say that the antenna member is electrically isolated. Therefore an electric field can be build up between the antenna member and electrical ground, usually a metal pipe. The antenna member comprises metal, can be partly made out of metal, or made of solid metal as long as the antenna member can build up an electric field between the antenna member and electrical ground.

The system according to the invention can be used for water-, as well as salinated water-, continuous multi-phase mixtures, hence mixtures with minimum 50% moisture content, and suspended solid matter therein. In such solid/liquid mixtures, an addition of any amount of soil into water will result in a noticeable reduction of the total mixture permittivity. This is due to a huge contrast between electrical permittivity of water that has a dielectric constant $\varepsilon r=79$ at VHF band, and permittivity of common soil constituents that has a dielectric constant Fr ranging 3 till 6. The solid/liquid mixtures is sometimes also referred to as mixture with particulates.

In an embodiment of the system, the ring shaped conductive antenna member comprises a closed ring. The closed ring offers a more predictable operation of the ring in waveguide mode and/or resonance mode.

In an embodiment of the system, the ring shaped conductive antenna member has a predetermined position, in particular radially perpendicular to a travel direction of the mixture. The predetermined position, radially perpendicular to a travel direction of the mixture, makes the system easier to integrate between pipe sections of a slurry conveying pipe line.

In an embodiment of the system, the ring shaped conductive antenna member comprises a hardened steel, in particular the ring shaped conductive antenna member is made of hardened steel. The ring shaped conductive antenna member being made of hardened steel allows direct contact between the antenna member and the mixture without too much wear of the antenna member.

In an embodiment of the system, in use, the ring shaped conductive antenna member is in contact with the mixture (M). The ring shaped conductive antenna member being in contact with the mixture (M) allows for a better electromagnetic coupling between the antenna member and the mixture.

In an embodiment of the system, the antenna arrangement comprises a number of ring shaped antenna members. The antenna arrangement comprising a number of ring shaped antenna members allows to increase the volume of mixture under test between e.g. two ring shaped antenna members. This in turn results in a better electromagnetic coupling between the antenna arrangement and the mixture.

In an embodiment of the system, the antenna arrangement comprises two ring shaped conductive antenna members that are mutually spaced to determine a the volume of mixture under test in between the two ring shaped conductive antenna members. The antenna arrangement comprising two ring shaped conductive antenna members allows an optimal integration with a pipe section of a velocity meter, optimizing the electromagnetic coupling between the antenna arrangement and the mixture, without increasing the installation length too much.

The invention uses existing end rings, as signal launcher and coupler, and does not require modification of the structure of the pipe. The embodiment fulfils all requirements of an electromagnetic velocity measurement, hence allows the two apparatus to be combined in the same unit.

In an embodiment of the system, the electromagnetic signal power source is configured to induce a resonance mode of the ring shaped conductive antenna member, and wherein a circumference of the ring shaped antenna equals multiple wavelengths of an output signal of the electromagnetic signal power source. This optimizes the electromagnetic coupling between the antenna arrangement and the mixture even more.

In an embodiment of the system, the evaluation unit comprises a transmitting unit coupled with the electromagnetic power source, a receiving unit coupled with antenna arrangement for receiving the response back from the volume of mixture under test, and a processing unit for processing the response. The evaluation unit enables to operate the system in closed loop and therefore provides the possibility to maintain a desired propagation mode within the mixture under test in a broad range of the concentration parameter that refers to a ratio between water content of the mixture and solid matter content.

In an embodiment of the system, the evaluation unit is configured to provide an amplitude and phase detection of the response back from the volume of mixture under test.

In an embodiment of the system, the evaluation unit is configured to control an energy feed from the electromagnetic power source to the antenna arrangement, such that the evaluation unit evaluates the energy feed during operation in a close loop fashion. This provides an improved control over the operation mode of the system also depending on conditions of the flow of a solid/liquid mixture. In order for the system to work in fresh and also seawater, enormous dynamic range, above 100 dB is required (fresh water is almost no signal loss, therefore very little power, seawater is very high loss, hence max output power and max amplification at the evaluation unit).

Therefore, in this case, there are provided two amplification stages on the power source and a cascade of three amplifiers on the evaluation unit, all of them controlled via a closed feedback loop.

In an embodiment, the system comprises at least one tuning member, like a shorting pin, in contact with the ring shaped conductive antenna member for determining a resonance mode and corresponding resonance frequency of the ring shaped conductive antenna member. This even more provides an improved control over the operation mode of the system.

The present invention therefore provides a measuring apparatus comprising a system for measuring of a concentration parameter of a flow of a solid/liquid mixture (M) as defined above, and a velocity metering unit for measuring a flow velocity of the mixture, in particular dredge. Including both systems in a measuring apparatus enables to decrease the installation length.

In an embodiment of the measuring apparatus, velocity metering unit comprises;

- a source of magnetic field arranged to engage with the mixture,
- a set of measuring electrodes for measuring a potential difference across the mixture resulting from the magnetic field,
- an electrical insulation layer isolating at least the mixture under test from a pipe wall,
- one or more ring shaped elements arranged adjacent the insulation layer and/or at least partly embedded in the insulation layer to protect the insulation layer against wear by the mixture,
- wherein the antenna arrangement comprises at least one end ring shaped element of the one or more ring shaped elements of the mixture velocity metering unit.

The present end ring or rings of the velocity metering system functioning as a ring shaped conductive antenna member enables that the installation length of such a combined system can be reduced.

In an embodiment of the measuring apparatus, the antenna arrangement comprises at least a pair of opposite ring shaped elements of the one or more ring shaped elements of the mixture velocity metering unit.

In an embodiment, the measuring apparatus comprises a hollow body element where the solid/liquid mixture (M) can flow through in an axial direction, wherein the pair of opposite ring shaped elements are arranged axially spaced apart in the hollow body element to define a measuring section there between, and wherein the hollow body element is connectable to a pipe section such that the solid/liquid mixture (M) flows within the hollow body element through the pair of opposite ring shaped elements.

The present invention therefore provides an assembly of a pipe section for transporting dredge coupled to a system for measuring of a concentration parameter of a flow of a solid/liquid mixture (M) as defined above, or coupled to a measuring apparatus as defined above. The ring shaped conductive antenna member enables a seamless coupling between the pipe section and the assembly. The flow surface maintains optimal and ensures a continuous flow.

In an embodiment of the assembly, the opening of the ring shaped conductive antenna member and a flow opening of the pipe section are similar such that the flow of the solid/liquid mixture (M) is not restricted.

The present invention therefore provides a method for retrofitting a system for measuring of a concentration parameter of a flow of a solid/liquid mixture (M) as defined above, or a measuring apparatus as defined above, to a dredging pipe assembly.

The present invention therefore provides a method for the measuring of a concentration parameter of a solid/liquid mixture (M), including: providing a system for measuring of a concentration parameter of a solid/liquid mixture (M) as defined above, providing the solid/liquid mixture (M) inside the system, wherein the antenna arrangement feeds a predetermined amount of electromagnetic energy such that the energy is transmitted through the volume of mixture under test, and wherein the evaluation unit evaluates the response back from the volume of mixture under test.

In an embodiment, the method comprises evaluating the energy feed into the solid/liquid mixture (M) during operation in a close loop fashion.

In an embodiment, the method comprises determining a velocity of the solid/liquid mixture.

SHORT DESCRIPTION OF DRAWINGS

The present invention will be discussed in more detail below, with reference to the attached drawings, in which FIG. 1A shows a schematic drawing in cross sectional view of a first embodiment of the system according to the invention;

FIG. 6-8 show each a simulation result in cross sectional top view of the first embodiment of the system according to the invention.

DESCRIPTION OF EMBODIMENTS

Figure 1A:
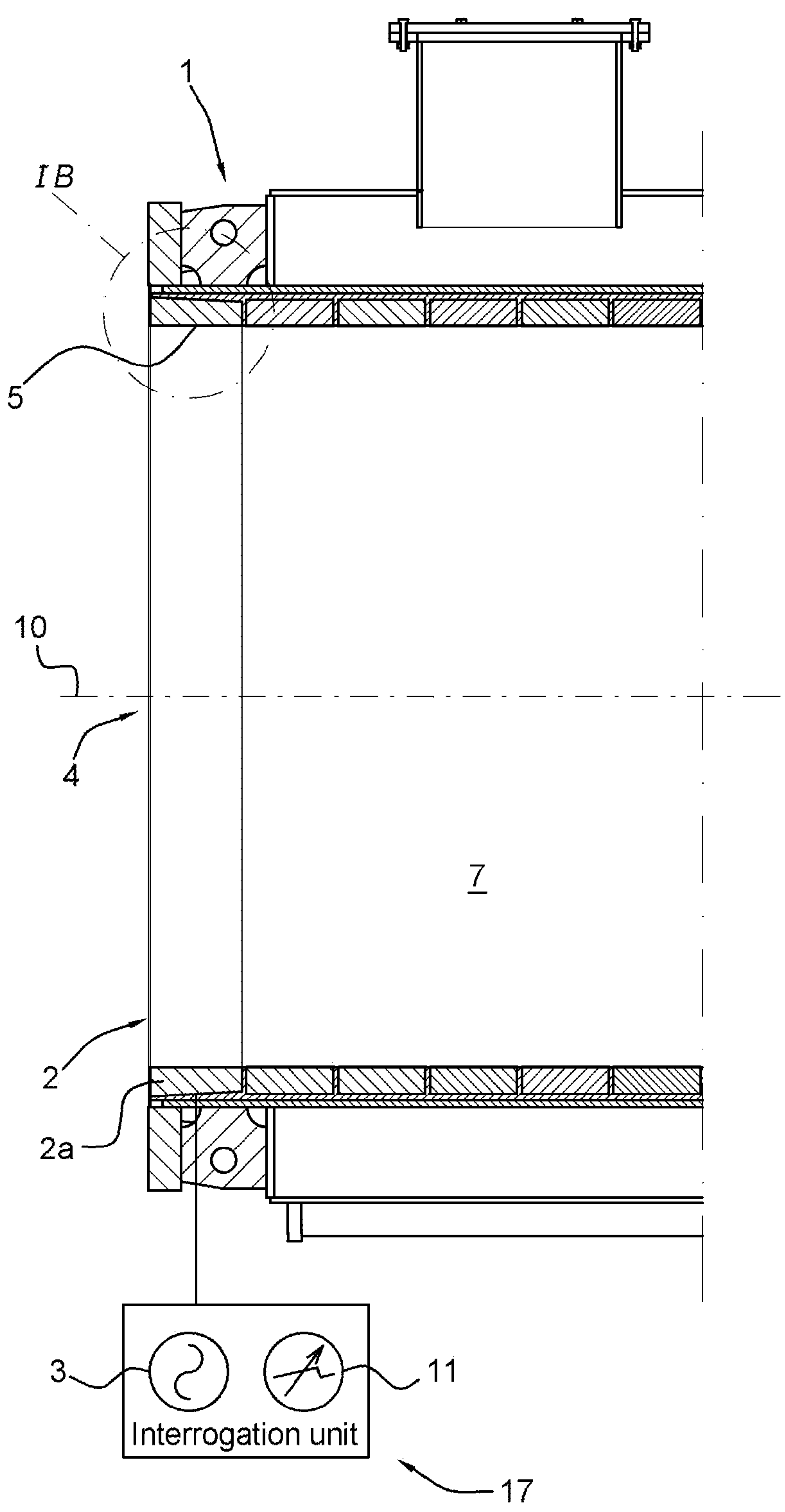
FIG. 1B shows a detail of FIG. 1A.
Figure 1B:
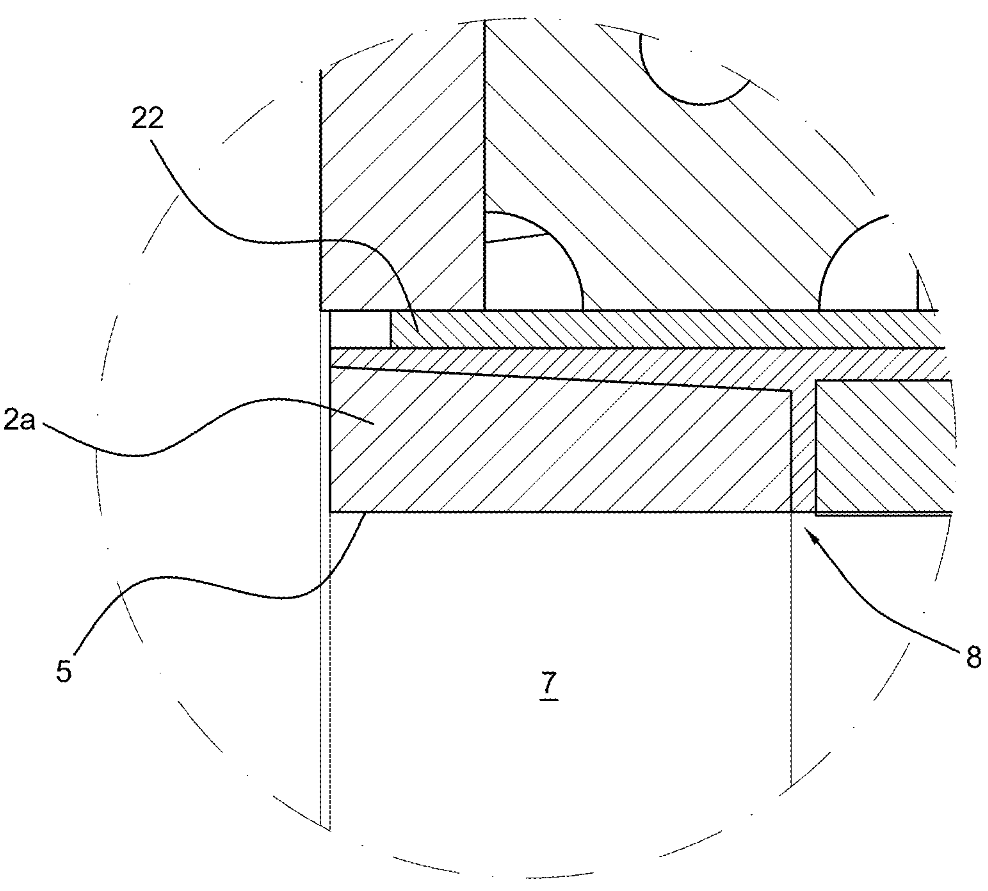

FIG. 1A shows a schematic drawing in cross sectional view of a first embodiment of the system 1 according to the invention. The system comprises an antenna arrangement 2. The antenna arrangement 2 is positioned for feeding electromagnetic energy into a volume of mixture under test (mut). The antenna arrangement 2 also functions to receive a response back from the volume of the mixture under test. The antenna arrangement 2 comprises a ring shaped conductive antenna member 2*a*. Here, the ring shaped conductive antenna member 2*a* is a solid closed ring made of hardened steel. The ring shaped conductive antenna member 2*a* has an opening 4. The ring shaped conductive antenna member 2*a* is positioned to allow passage of the flow of solid/liquid mixture (M) through the opening 4. Here, an inner surface 5 of the ring shaped conductive antenna member 2*a* is in direct contact with the mixture (M). In this case, the ring shaped conductive antenna member 2*a* is positioned radially perpendicular to a travel direction of the mixture. The travel direction of the mixture is along a central axis 10 of the system 1. The ring shaped conductive antenna member 2*a* and the opening 4 thereof define the measurement volume of mixture under test 7.

Figure 6A:
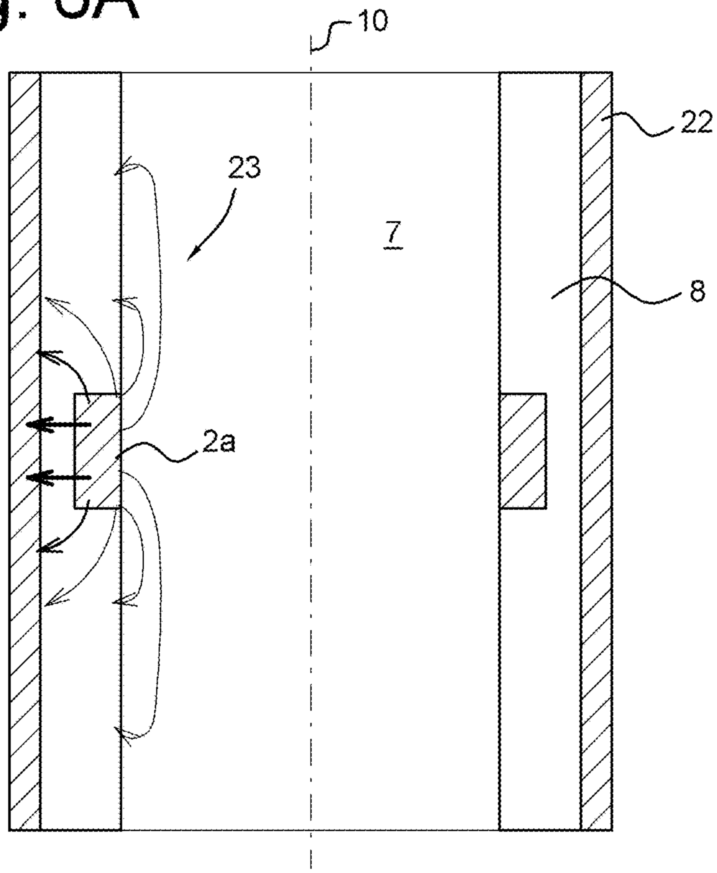

The system 1 comprises a electromagnetic signal power source 3. The electromagnetic signal power source 3 is operationally coupled with the antenna arrangement 2. The electromagnetic signal power source 3 is operationally coupled with the ring shaped conductive antenna member 2*a* of the antenna arrangement 2. The electromagnetic signal power source 3 and the ring shaped conductive antenna member 2*a* are configured such that the antenna arrangement provides a transmission path 23, see FIG. 6A, of an electromagnetic wave through the mixture under test 7. The system can be operated in resonance mode. In resonance mode, a circumference of the ring shaped antenna member 2*a* equals multiple wavelengths of an output signal of the electromagnetic signal power source 3. The signal travels angularly along the ring 2*a* in both directions. If the signal frequency from the electromagnetic signal power source 3 fulfils the resonance condition, when the signals from opposite directions meet, they interfere constructively, in other words they add up, and the ring resonates. This is how the ring operates in self resonance. The resonance frequency depends on the dimensions of the ring. Most of the field is contained between the ring 2*a* and the pipe wall 22. However a fringing field 23, as shown in FIG. 6A also must loop through the MUT, in particular at the top side of the ring. The ring 2*a* can be considered a circular microstrip waveguide.

The system 1 comprises an evaluation unit 17. The evaluation unit 17 comprises an interrogation unit 11. The evaluation unit 17 is operationally coupled with the antenna arrangement 2. Here, the evaluation unit 17 is operationally coupled with the antenna arrangement through the interrogation unit 11. The evaluation unit 17 is configured for evaluating the response back from the volume of mixture under test 7.

Figure 2:
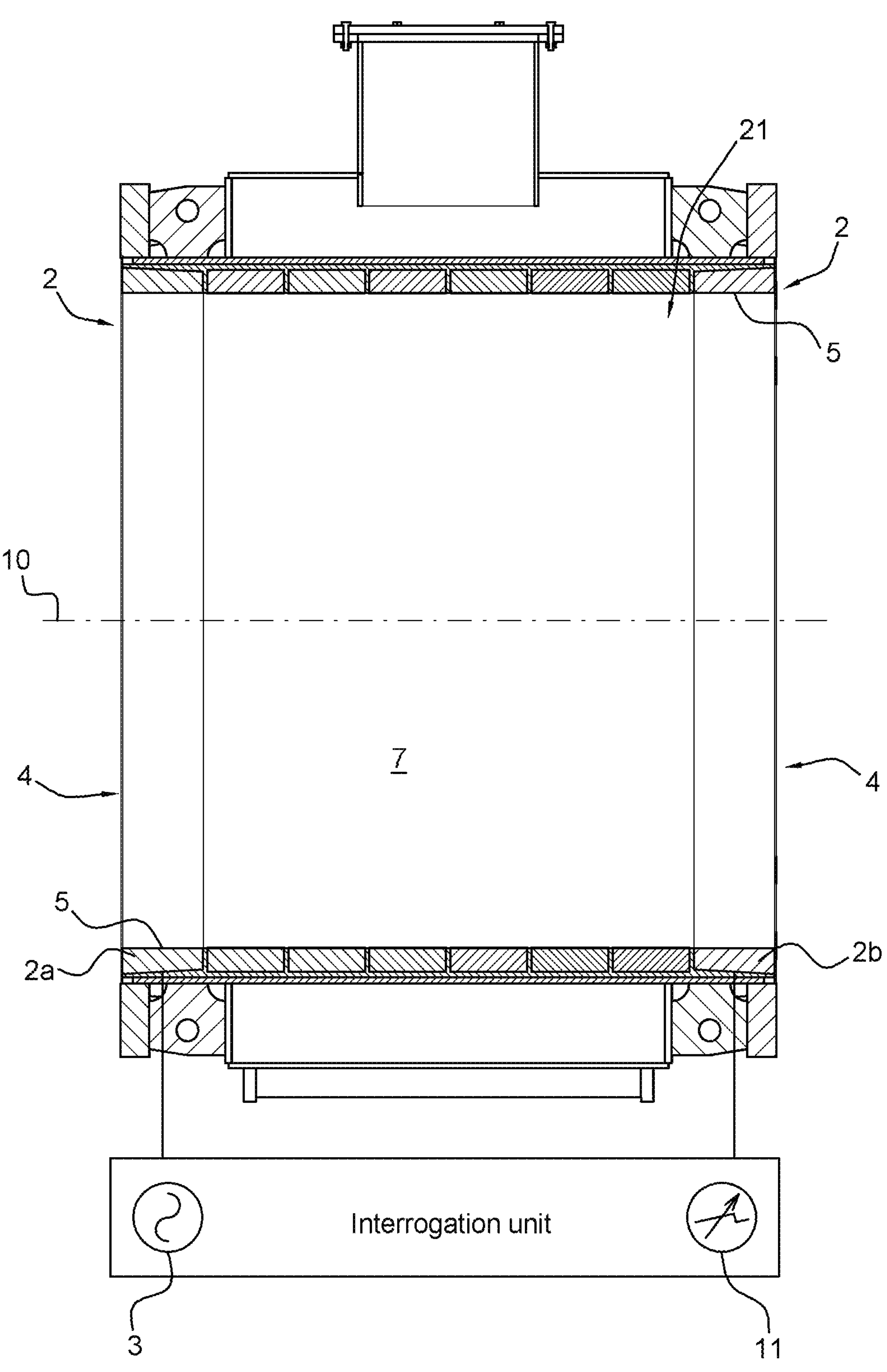
FIG. 2 shows a schematic drawing in cross sectional view of a second embodiment of the system according to the invention.

FIG. 2 shows a schematic drawing in cross sectional view of a second embodiment of the system 1 according to the invention. In this case, the antenna arrangement 2 comprises a number of ring shaped antenna members 2*a*, 2*b*. Here, the antenna arrangement 2 has two ring shaped conductive antenna members 2*a*, 2*b*. The two ring shaped conductive antenna members 2*a*, 2*b* are mutually spaced. The two ring shaped conductive antenna members 2*a*, 2*b* are mutually spaced to determine the volume of mixture under test. The volume of mixture under test is defined in between the two ring shaped conductive antenna members 2*a*, 2*b*.

The electromagnetic signal power source 3 and the ring shaped conductive antenna member 2*a* are configured such that the antenna arrangement in conjunction with the mixture under test 7 between the mutually spaced two ring shaped conductive antenna members 2*a*, 2*b* and the hollow body element 21 is operated in waveguide mode. The ring shaped conductive antenna member 2*a* excites a certain waveguide mode TE, TM or TEM through the mixture under test 7 between the mutually spaced two ring shaped conductive antenna members 2*a*, 2*b*. A useful parameter that associates with a certain density of the mixture under test is the transmission phase shift between the pair of ring electrodes 2*a*, 2*b*.

Between the mutually spaced two ring shaped conductive antenna members 2*a*, 2*b*, a hollow body element 21 is provided. In this case, a cylindrical waveguide is formed through the hollow body element 21. In this case, a resonance frequency depends on the size of the pipe 21, thickness of the ring 2*a*, 2*b* and thickness of insulation layer 8, see FIG. 4. The solid/liquid mixture (M) can flow through the hollow body element 21 in an axial direction, that is along the central axis 10 of the system 1. The two ring shaped conductive antenna members 2*a*, 2*b* and the hollow body element 21 are aligned along the central axis 10 of the system 1. The two ring shaped conductive antenna members 2*a*, 2*b* are thus axially spaced apart in or by the hollow body element 21 to define a measuring section there between. The transmission path of a guided wave extends between two ring shaped conductive antenna members 2*a*, 2*b* and along the central axis 10. The hollow body element 21 is connectable to a pipe section (not shown here) such that the solid/liquid mixture (M) flows within the hollow body element 21 through the two ring shaped conductive antenna members 2*a*, 2*b*.

Figure 3:
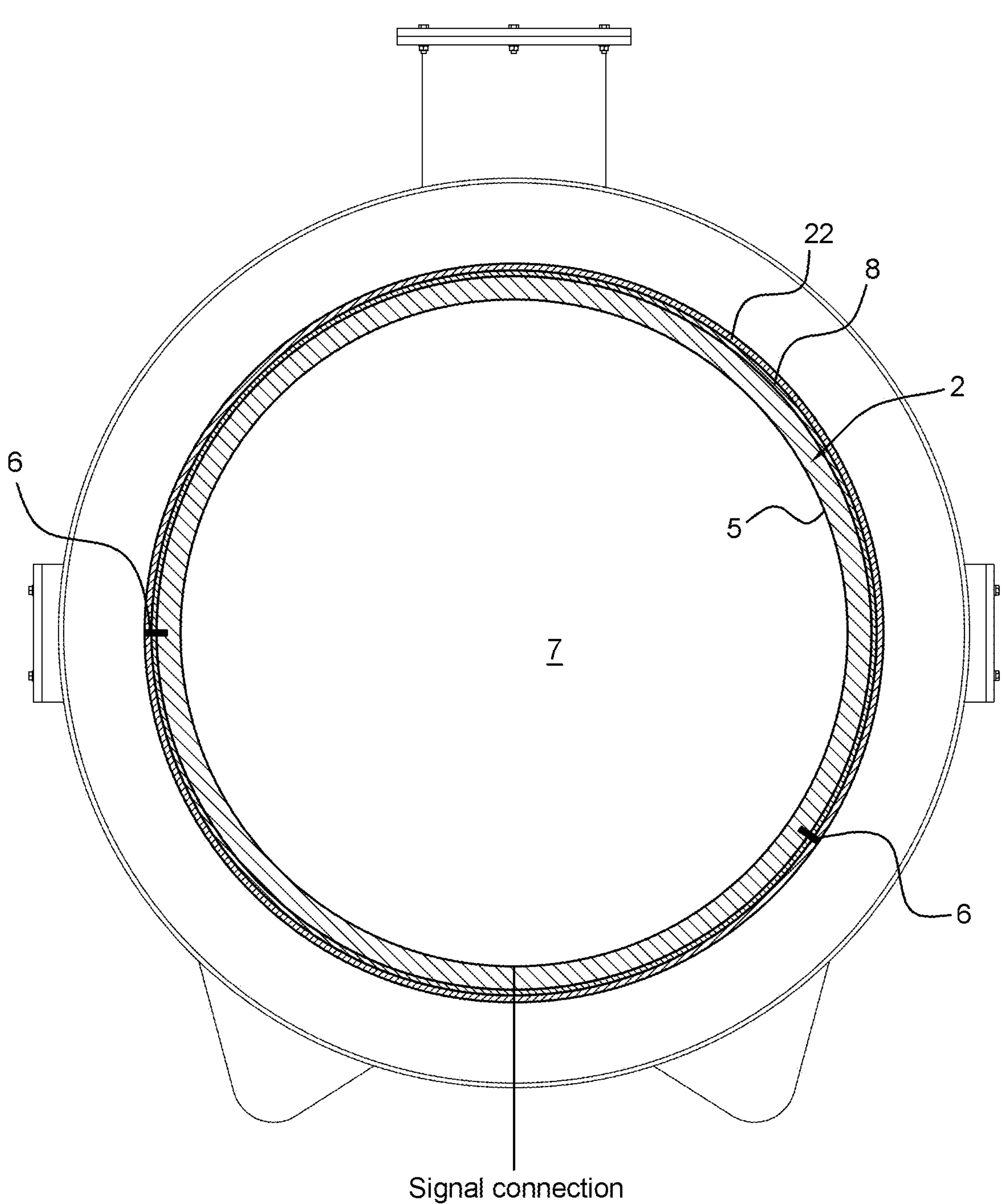
FIG. 3 shows a schematic drawing in cross sectional view of a third embodiment of the system according to the invention.

FIG. 3 shows a schematic drawing in cross sectional front view of a third embodiment of the system 1. The system 1 comprises at least one tuning member 6. In this case, two tuning members 6 are provided in the form of shorting pins. These shorting pins contact the ring shaped conductive antenna member 2*a*. The position of contact between the shorting pins and the ring shaped conductive antenna member 2*a* determines a resonance mode and corresponding resonance frequency of the ring shaped conductive antenna member 2*a*. As can be seen, the shorting pin 6 extends through pipe wall 22 and an isolation layer 8 that electrically isolates the mixture under test 7 from the pipe wall 22. The ring shaped conductive antenna member 2*a* is supported by the isolation layer 8 as well.

Figure 4:
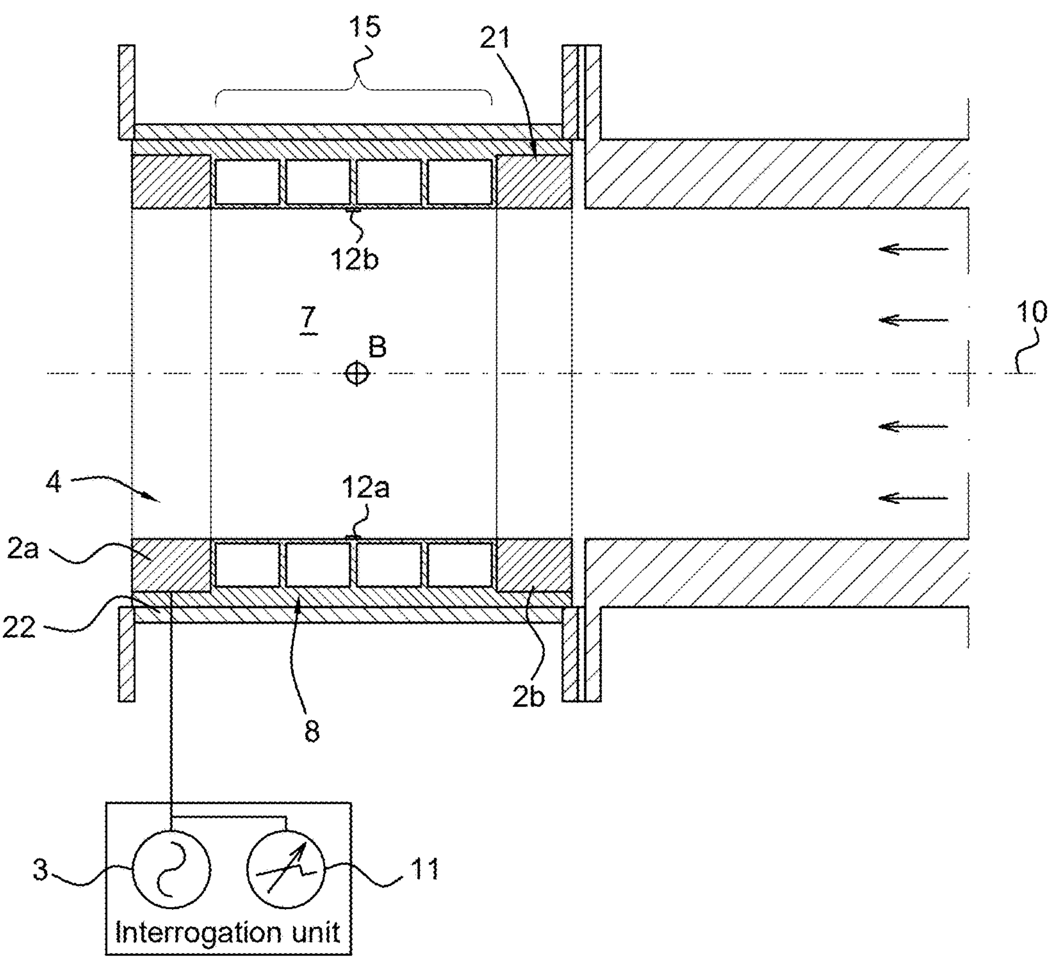
FIG. 4 shows a schematic drawing in cross sectional view of a measuring apparatus comprising the embodiment of FIG. 2 as well as velocity metering unit known per se.

FIG. 4 shows a schematic drawing in cross sectional view of a measuring apparatus comprising the embodiment of FIG. 2 as well as velocity metering unit 15 known per se. The velocity metering unit 15 comprises a source (not shown) of magnetic field indicated with a B. The magnetic field B is arranged to engage with the mixture under test 7. The velocity metering unit 15 comprises a set of measuring electrodes 12*a*, 12*b* for measuring a potential difference across the mixture under test 7 resulting from the magnetic field B. The velocity metering unit 15 comprises an electrical insulation layer 8 for isolating at least the mixture under test 7 from a pipe wall 22. Although it is shown here that the first antenna member 2*a* is connected to the signal power source 3 as well as to the interrogation unit 11, it will be clear that is conceivable that the first antenna member 2*a* is connected to the signal power source 3 and the interrogation unit 11 to the second antenna member 2*b*.

Figure 5:
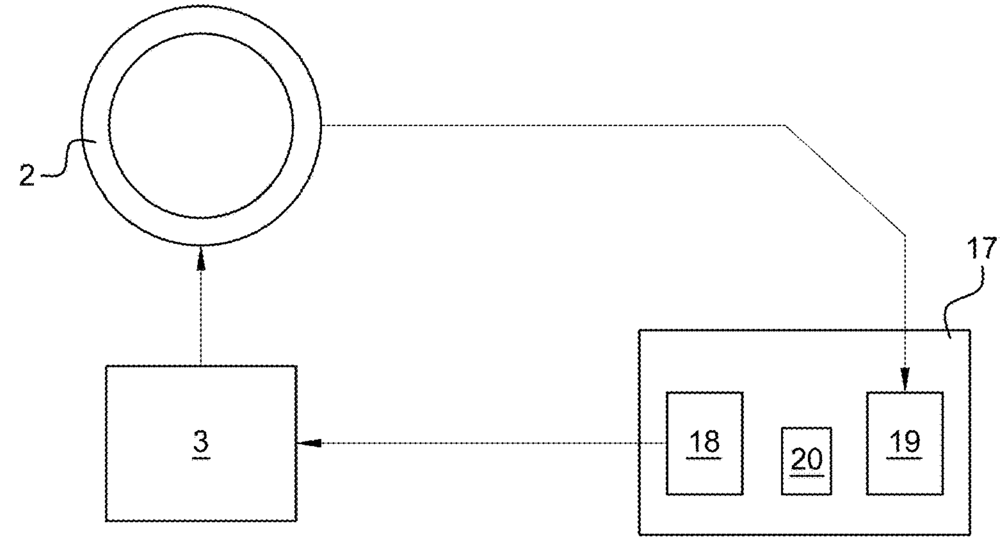
FIG. 5 shows a schematic view of a signal supply and readout circuit for the system according to the invention.

FIG. 5 shows a schematic view of a signal supply and readout circuit for the system 1 according to the invention. The evaluation unit 17 comprises a transmitting unit 18 coupled with the electromagnetic power source 3. The evaluation unit 17 comprises a receiving unit 19 coupled with antenna arrangement 2 for receiving the response back from the volume of mixture under test. The evaluation unit 17 comprises a processing unit 20 for processing the response. Here, the evaluation unit 17 is configured to provide an amplitude and phase detection of the response back from the volume of mixture under test. Importantly, the evaluation unit 17 is configured to control an energy feed from the electromagnetic power source 3 to the antenna arrangement 2 such that the evaluation unit evaluates the energy feed during operation in a close loop fashion.

FIGS. 6-8 show a simulation result in cross sectional top view of the first embodiment of the system according to the invention as shown in FIG. 1A. The main elements of the system 1 are shown in FIG. 6A and are modelled in the simulation environment. Firstly, the main structure of the metal pipe 22 and the isolation layer 8 that electrically isolates the mixture under test 7 from the pipe wall 22. Secondly, the ring shaped conductive antenna member 2*a*, in short "ring". The ring 2*a* is a solid closed ring made of hardened steel. The ring shaped conductive antenna member 2*a* is partly embedded in the isolation layer 8. An inner surface of the ring 2*a* is flush with the inner surface of the isolation layer 8 so that the flow of mixture under test 7 is not hindered. The RF signal is applied to the ring 2*a*. The pipe wall 22 is electrically grounded.

Figure 6B:
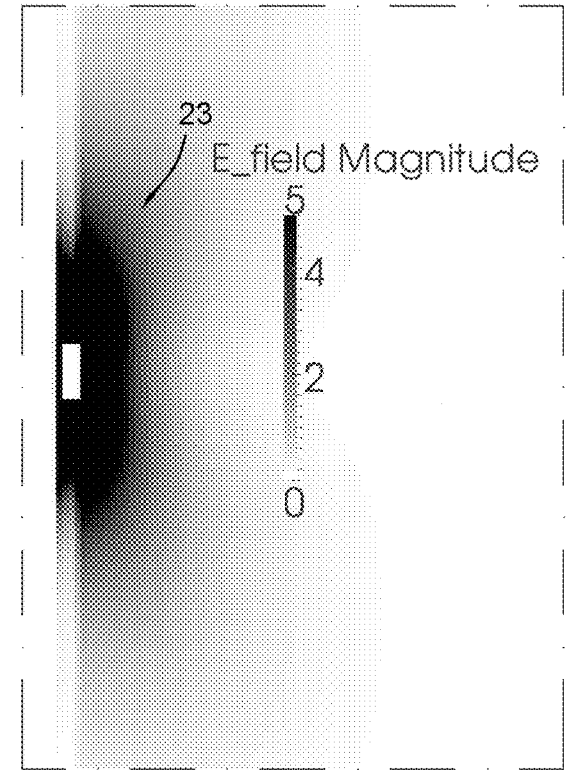

In FIG. 6A, electric field lines are shown that build up between the ring 2*a* and the pipe wall 22 because of the RF signal applied to the ring 2*a*. A fringing field 23 is build up in the interior of the pipe 22. In the case of FIGS. 6A and 6B the interior of the pipe is filled with air. FIG. 6B shows the magnitude of the electric field.

Figure 7A:
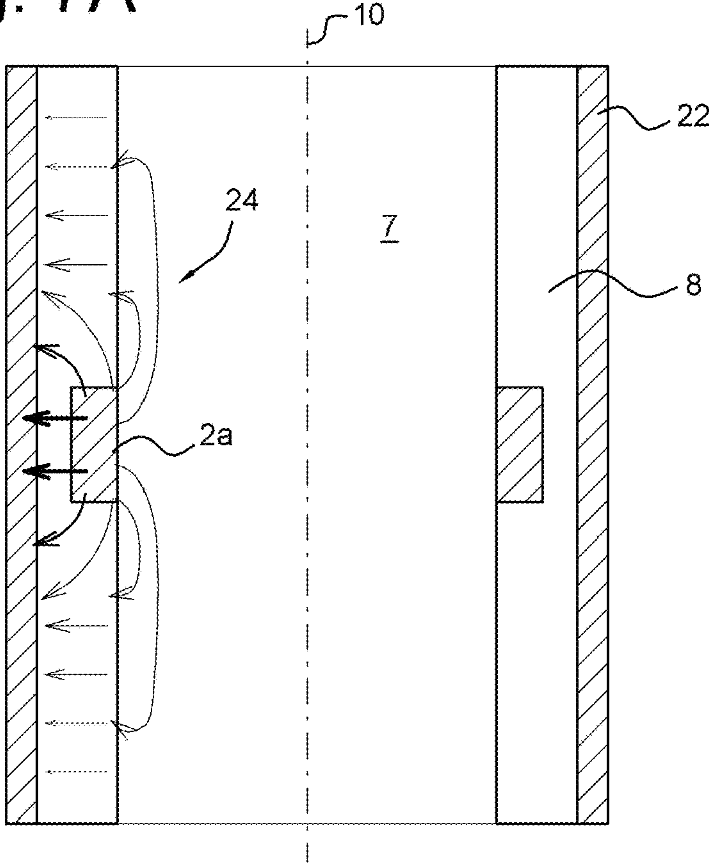
Figure 7B:
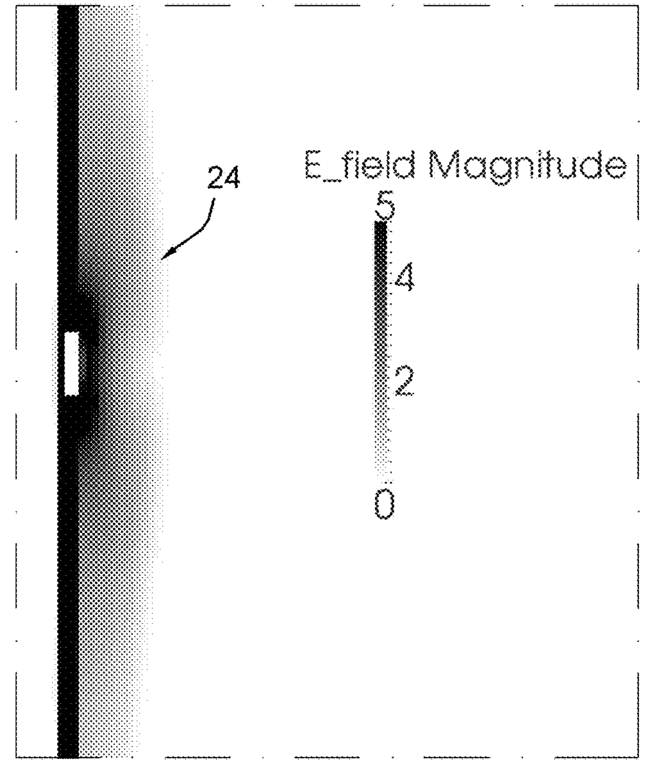

The case of FIGS. 7A and 7B differ in that the interior of the pipe is filled with water. As can be seen, less field or field with a lower magnitude is build up in the interior compared with a pipe filled with air. This difference is detectable at the contact terminals to the ring 2*a* and the pipe wall 22. Of course the difference can be detected at other separate contact terminals as well. FIG. 7B shows the magnitude of the electric field.

In FIG. 8, the electric field is simulated across the diameter of the pipe. The interior of the pipe is filled with water. One can see that the field extends across the entire cross section which is an indication of the sensitivity of the system according to the invention.

Figure 9:
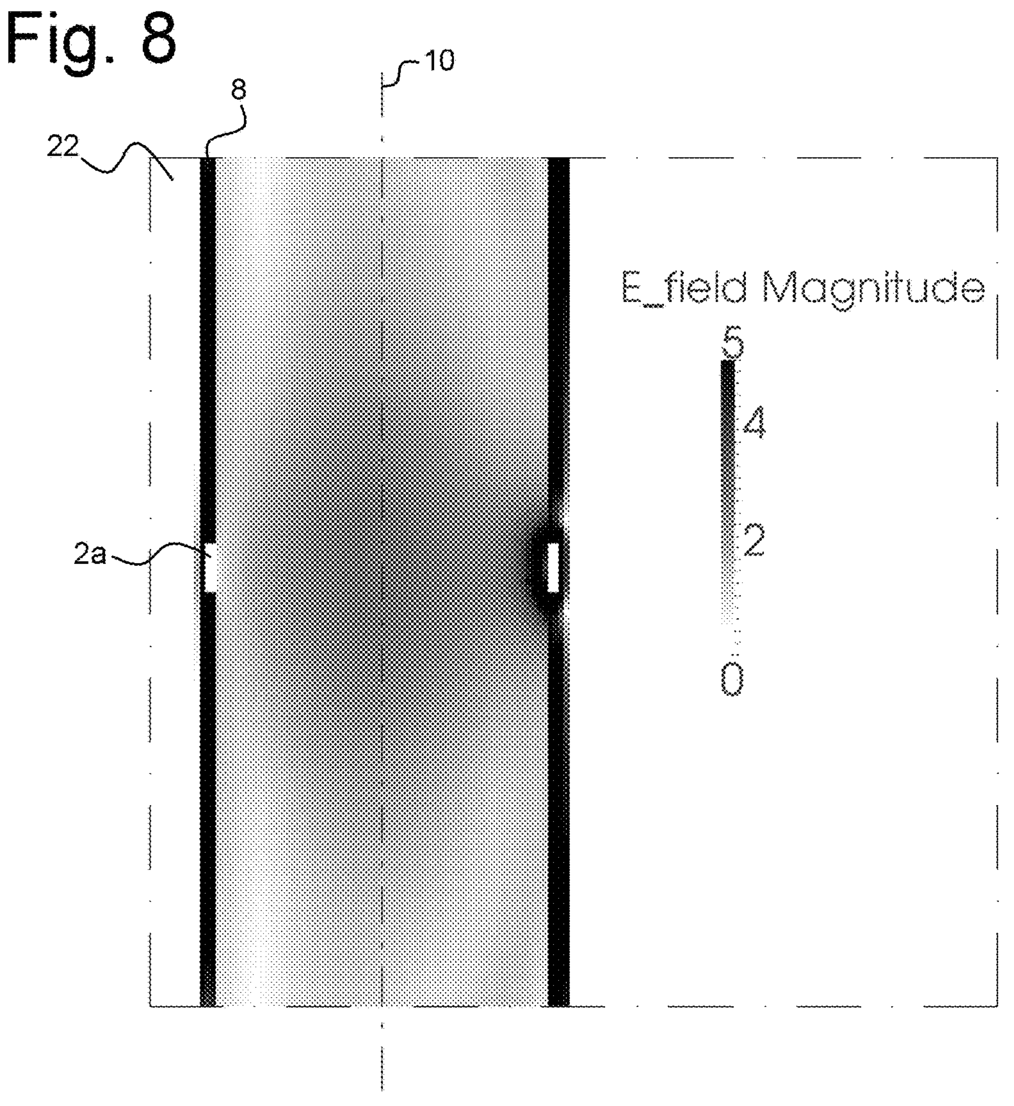
FIG. 9 shows a graph of an experimental result of the second embodiment of the system according to the invention.

FIG. 9 shows a graph of an experimental result of the second embodiment of the system according to the invention. The device was a standard velocity measurement pipe, supplemented with a transmitting and receiving rings and the interrogation unit. The device was tested in a test circuit capable of creating water-sand mixture stream. The phase shift of transmission between the pair of ring electrodes (phase of the S21 scattering parameter) is plotted against a density of the mixture under test. The graph confirms that transmission phase shift is a strong and monotonic function of density, and can be used for determining of solids concentration in a dredge mixture.

The present invention has been described above with reference to a number of exemplary embodiments as shown in the drawings. Modifications and alternative implementations of some parts or elements are possible, and are included in the scope of protection as defined in the appended claims.

The invention claimed is:

1. A system for measuring of a concentration parameter of a flow of a solid/liquid mixture, the system comprising;

an antenna arrangement for feeding electromagnetic energy into a volume of mixture under test, and receiving an electromagnetic response back from the volume of mixture under test, an electromagnetic signal power source operationally coupled with the antenna arrangement, an evaluation unit operationally coupled with the antenna arrangement for evaluating the electromagnetic response back from the volume of mixture under test, wherein the antenna arrangement comprises an isolated ring shaped conductive antenna member having an opening for passing the flow of solid/liquid mixture there through, wherein the ring shaped conductive antenna member and the opening thereof define the volume of mixture under test, and wherein the electromagnetic signal power source and the ring shaped conductive antenna member are configured such that the antenna arrangement provides a transmission path of an electromagnetic wave through the mixture under test.

2. The system according to claim 1, wherein the ring shaped conductive antenna member comprises a closed ring.

3. The system according to claim 1, wherein the ring shaped conductive antenna member has a predetermined position, which is radially perpendicular to a travel direction of the mixture.

4. The system according to claim 1, wherein the ring shaped conductive antenna member comprises a hardened steel.

5. The system according to claim 1, wherein in use, the ring shaped conductive antenna member is in contact with the mixture.

6. The system according to claim 1, wherein the antenna arrangement comprises a plurality of antenna members.

7. The system according to claim 6, wherein the antenna arrangement comprises two ring shaped conductive antenna members that are mutually spaced to determine the volume of mixture under test in between the two ring shaped conductive antenna members.

8. The system according to claim 1, wherein the electromagnetic signal power source is configured to induce a resonance mode of the ring shaped conductive antenna member, and wherein a circumference of the ring shaped antenna equals multiple wavelengths of an output signal of the electromagnetic signal power source.

9. The system according to claim 1, wherein the evaluation unit comprises a transmitter coupled with the electromagnetic power source, a receiver coupled with antenna arrangement for receiving the electromagnetic response back from the volume of mixture under test, and a processor for processing the response.

10. The system according to claim 1, wherein the evaluation unit is configured to provide an amplitude and phase detection of the electromagnetic response back from the volume of mixture under test.

11. The system according to claim 1 wherein the evaluation unit is configured to control an energy feed from the electromagnetic power source to the antenna arrangement, such that the evaluation unit evaluates the energy feed during operation in a close loop fashion.

12. The system according to claim 1, comprising at least one tuning member in contact with the ring shaped conductive antenna member for determining a resonance mode and corresponding resonance frequency of the ring shaped conductive antenna member.

13. A measuring apparatus comprising the system according to claim 1 and a velocity metering unit for measuring a flow velocity of the mixture.

14. The measuring apparatus of claim 13, wherein the velocity metering unit comprises;

a source of magnetic field arranged to engage with the mixture under test, a set of measuring electrodes for measuring a potential difference across the mixture under test resulting from the magnetic field, an electrical insulation layer isolating at least the mixture under test from a pipe wall, one or more ring shaped elements arranged adjacent the insulation layer and/or at least partly embedded in the insulation layer to protect the insulation layer against wear by the mixture, wherein the antenna arrangement comprises at least one ring shaped element of the one or more ring shaped elements of the mixture velocity metering unit.

15. The measuring apparatus of claim 14, wherein the antenna arrangement comprises at least a pair of opposite ring shaped elements of the one or more ring shaped elements of the mixture velocity metering unit.

16. The measuring apparatus of claim 15, comprising a hollow body element where the solid/liquid mixture can flow through in an axial direction, wherein the pair of opposite ring shaped elements are arranged axially spaced apart in the hollow body element to define a measuring section there between, and wherein the hollow body element is connectable to a pipe section such that the solid/liquid mixture flows within the hollow body element through the pair of opposite ring shaped elements.

17. An assembly of a pipe section for transporting dredge coupled to the system according to claim 1.

18. The assembly according to claim 17, wherein the opening of the ring shaped conductive antenna member and a flow opening of the pipe section are similar such that the flow of the solid/liquid mixture is not restricted.

19. A method for retrofitting the system according to claim 1, to a dredging pipe assembly, comprising installing the system into the dredging pipe assembly.

20. A method for the measuring of a concentration parameter of a solid/liquid mixture, including: providing the system for measuring of a concentration parameter of a solid/liquid mixture according to claim 1, providing the solid/liquid mixture inside the system, wherein the antenna arrangement feeds a predetermined amount of electromagnetic energy such that the energy is transmitted through the volume of mixture under test, and wherein the evaluation unit evaluates the electromagnetic response back from the volume of mixture under test.

21. The method according to claim 20, comprising evaluating the feeding of the predetermined amount of electromagnetic energy into the solid/liquid mixture during operation in a close loop fashion.

22. The method according to claim 20, comprising determining a velocity of the solid/liquid mixture.

* * * * *